Feb. 14, 1933.  S. C. CARTER  1,897,944
VEHICLE DRIVE
Filed Dec. 6, 1929  2 Sheets-Sheet 1
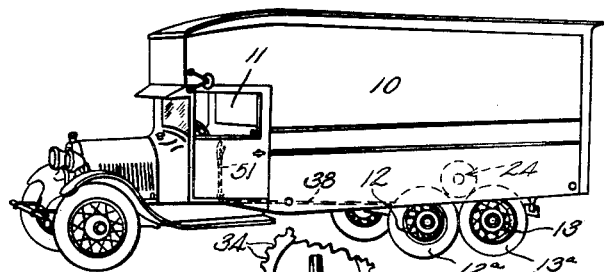
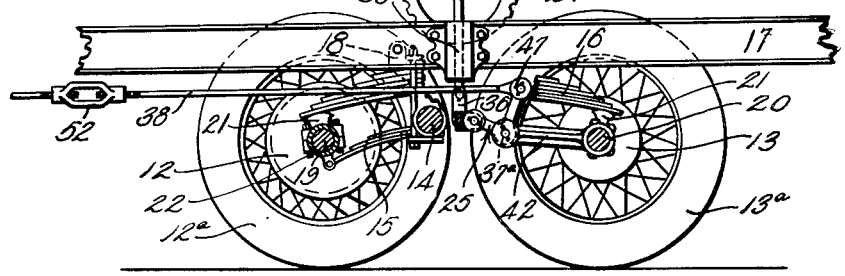
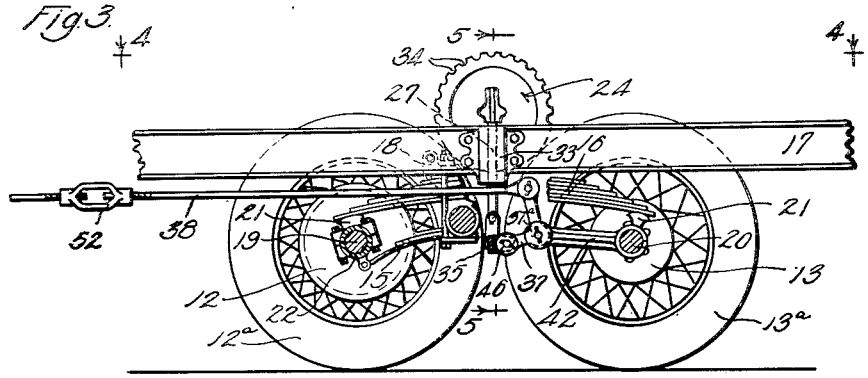
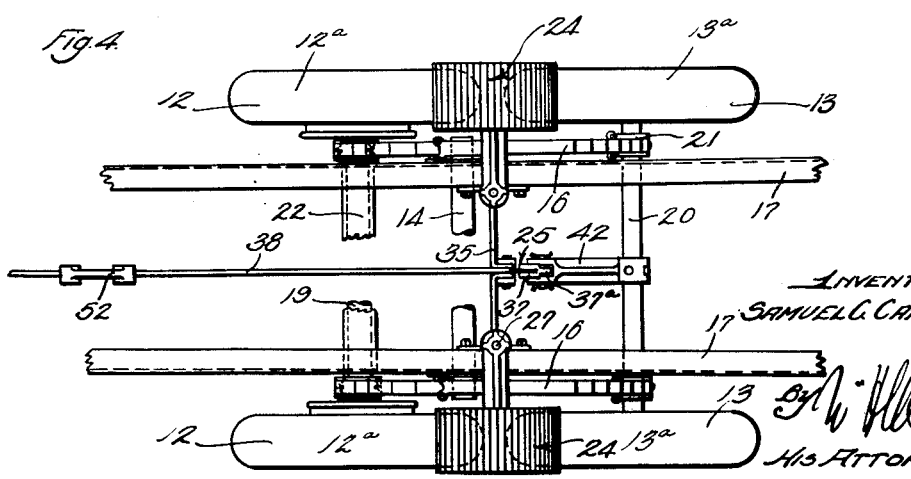

Feb. 14, 1933.   S. C. CARTER   1,897,944
VEHICLE DRIVE
Filed Dec. 6, 1929    2 Sheets-Sheet 2
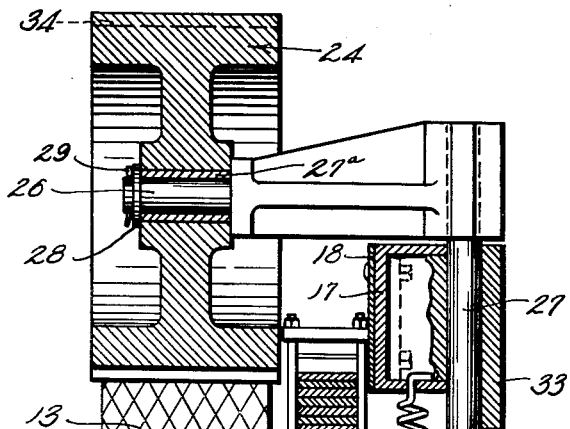
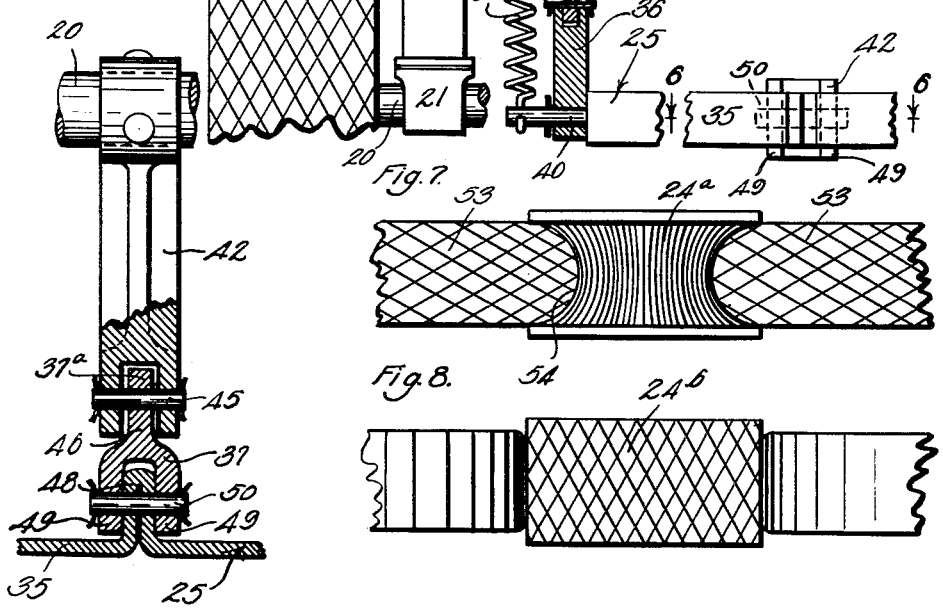
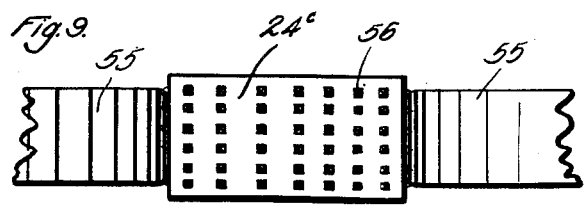
INVENTOR
SAMUEL C. CARTER
HIS ATTORNEY Patented Feb. 14, 1933

1,897,944

UNITED STATES PATENT OFFICE

SAMUEL C. CARTER, OF LOS ANGELES, CALIFORNIA

VEHICLE DRIVE

Application filed December 6, 1929. Serial No. 412,102.

This invention relates to a vehicle drive and relates more particularly to a drive for a motor driven vehicle having wheels driven by the motor and extension wheels or wheels that are not driven by the motor.

Motor driven vehicles, such as trucks, are often provided with six or more wheels, two or more of which are not driven by the motor but are provided to carry part of the load. It is common practice in trucks of this character, to have two pairs of rear wheels, one pair only being driven from the motor. For example, heavy duty trucks are often provided with two rear driven wheels and two rear extension wheels or idle wheels to aid in supporting the load. In vehicles of this type, the wheel mountings are such that the load at the rear portion of the vehicle is divided between the drive wheels and the extension wheels; that is, the drive wheels carry part of the load and the extension wheels carry part of the load. When vehicles of this character encounter roads that are wet, muddy, or sandy, it is sometimes found that the drive wheels do not have sufficient traction.

It is a general object of the invention to provide an optional drive between the drive wheels and the extension wheels of a vehicle, such as a truck, that may be employed when the drive wheels do not provide sufficient traction with the road surface to properly operate or drive the vehicle.

Another object of the invention is to provide a vehicle drive of the character mentioned that may be normally idle or inoperative but ready for operation whenever necessary or desired.

It is another object of the invention to provide an optional drive of the character mentioned that may be actuated or put into operation from the operator's compartment of the vehicle.

Another object of the invention is to provide a vehicle drive of the character mentioned that may be in the form of an attachment that may be embodied in or applied to a vehicle without altering the standard or usual drive equipment or other parts of the vehicle.

Another object of the invention is to provide a vehicle drive of the character mentioned that drives the extension or idle wheels of the vehicle from the driven wheels through a driving connection in the form of an intermediate wheel or idler operable into engagement with the tires of the driven wheels and the extension wheels.

A further object of the invention is to provide a drive of the character mentioned in which the driving connections between the driven wheels and the extension wheels are in the form of freely rotatable idlers operable simultaneously into and out of engagement with the tires of the driven wheels and the extension wheels at the opposite sides of the vehicle.

Another object of the invention is to provide idlers in a vehicle drive of the character mentioned that are formed to engage the tires of the vehicle wheels to form a drive between the driven wheels and the extension wheels without injuring the tires on the wheels.

A further object of the invention is to provide a vehicle drive of the character mentioned that embodies but few parts and is simple and inexpensive of manufacture.

Other objects and features of my invention will be best and more fully understood from the following detailed description of a typical form and application of the invention, throughout which description reference is had to the accompanying drawings, in which:

Fig. 1 is a side perspective view of a typical truck illustrating the drive provided by this invention in operative position. Fig. 2 is a side elevation of a portion of the truck illustrating the drive mechanism provided by this invention mounted on the truck showing certain parts in section and showing the intermediate wheel or idler provided by this invention in an idle or inoperative position. Fig. 3 is a view similar to Fig. 2 illustrating the idler in cooperative engagement with the driven and extension wheels of the truck. Fig. 4 is a top or plan view of the rear portion of the truck taken substantially as indicated by line 4—4 on Fig. 3, being a view showing the body of the truck and other parts removed. Fig. 5 is an enlarged vertical detailed sectional view taken as indicated by line 5—5 on Fig. 3. Fig. 6 is an enlarged horizontal detailed sectional view taken as indicated by line 6—6 on Fig. 5. Fig. 7 is a top or plan view of a form of idler adapted to be used in connection with tires having rounded treads. Fig. 8 is a view of a type of idler adapted to be used in connection with solid rubber tires having flat treads. Fig. 9 is a top or plan view of another form of idler.

In the drawings I have illustrated a typical form of truck having an enclosed body 10, a driver's compartment 11, and other parts common to vehicles of this class. The form of truck shown is provided with four rear wheels, two of which are driven wheels and two of which are idle or extension wheels. The forward pair of wheels 12 may be considered the drive or driven heels while the rear pair may be considered the idle or extension wheels 13. The truck may be supported on the wheels 12 and 13 through a transverse shaft 14 and upper and lower sets of springs 16 and 15, respectively. The shaft 14 is connected to the frame members 17 of the truck through brackets 18. The drive wheels 12 are carried on an axle 19 and the extension wheels 13 may be carried on an axle 20. In the particular case illustrated, the wheels 12 are provided with pneumatic tires 12ª while the wheels 13 are provided with similar tires 13ª. The set of springs 15, which is the lower set, partially supports the frame of the truck on the wheels 12 and 13 through the shaft 14 and shackles 21 connecting the ends of the spring set with the axle 20 and the housing 22 encasing the axle 19. The upper set of springs 16 is mounted on the shaft 14 and its ends are engaged by the shackles 21. In the particular case shown the shaft 14 is located closer to the axle 19 than it is to the axle 20 so that a greater proportion of the load is supported on the wheels 12 than is carried by the wheels 13.

Throughout the following detailed description I will consider the drive provided by this invention as adapted to operate in connection with the wheels 12 and 13. The drive provided by this invention is adapted to be employed on various types and classes of vehicles and therefore the invention is not to be construed as limited to the particular application or form about to be described but is to be taken as including any features or modifications that may fall within the scope of the claims.

The device provided by this invention includes, generally, intermediate wheels or idlers 24 operable between positions free of the tires 12ª and 13ª of the wheels 12 and 13, respectively, and positions where they are in cooperative engagement with the tires 12ª and 13ª to form a drive between the wheels 12 and 13, and means 25 for simultaneously operating the idlers 24 into and out of engagement with the tires 12ª and 13ª.

The intermediate wheels or idlers 24 are provided to form a driving connection between the wheels 12 and 13 of the vehicle. There is preferably an idler 24 at each side of the truck so that the drive wheels 12 and the extension wheels 13 at both sides of the truck may be operatively connected. In accordance with the invention the idlers 24 are in the form of freely rotatable wheels operable from free positions to positions where they engage the tires 12ª and 13ª of the wheels 12 and 13. The idlers 24 are shiftably mounted on the frame members 17 of the truck. In the preferred form of the invention the idlers 24 are arranged between and above the axles 19 and 20 and are arranged at the outer sides of the frame members 17, to be in line with the wheels 12 and 13. The idlers 24 are rotatably mounted on trunnions 26 projecting from supports 27. The trunnions 26 extend parallel to the axles 19 and 20 and carry the idlers 24 so that they are in alignment with the peripheries of the tires 12ª and 13ª. The idlers 24 may be mounted on the trunnions 26 through suitable bushings 27ª and may be held against displacement from the trunnions by thrust washers 28 and keys 29. The supports 27 are slidably carried or connected with the frame members 17 so as to be shiftable vertically. In practice the supports are located so that they do not interfere with the various parts of the truck. In the case illustrated they are shown at the inner sides of the frame members. The supports may be slidably mounted on the frame member 17 by suitable brackets 33.

The peripheries of the idlers 24 may be formed to effectively engage the treads of the tires 12ª and 13ª to form a drive between the wheels 12 and 13 without injuring the tires. In Figs. 2, 3, 4, and 5 of the drawings I have illustrated the idlers 24 as having straight or axial peripheries which are serrated or provided with a plurality of spaced axially extending grooves 34. The peripheries of the idlers 24 are preferably comparatively wide so as to engage entirely across the treads of the tires 12ª and 13ª.

The means 25 for actuating the idlers 24 between idle or free positions and driving or operative positions includes a control whereby an operator in the operator's compartment 11 of the truck may simultaneously operate the supports 27 vertically.

The means 25 may include a horizontally arranged rod 35, links 36 operatively connecting the rod 35 with the supports 27, a crank or lever 37 for shifting the rod 35, and an actuating rod 38 for operating the lever 37. The rod 35 extends transversely of the truck and is preferably parallel with axles 19 and 20. In the particular case illustrated, the rod 35 is located between the axles 19 and 20. The opposite ends of the rod 35 are spaced below the frame members 17 of the truck. In the preferred form of the invention the ends of the rod 35 are in substantially vertical alignment with and below the lower ends of the supports 27. The rod 35 is preferably of rectangular cross sectional configuration as illustrated throughout the drawings. An outwardly projecting pin 40 is provided at each end of the rod 35. A link 36 is pivotally mounted on each pin 40. The links 36 project upwardly from the pins 40 and their upper ends are pivotally connected with the lower ends of the supports 27. The upper ends of the links 36 may be yoked and pivot pins 41 may extend through the yoked portions of the links and openings 41ª in the supports 27 to pivotally connect the links and supports.

The lever 37 is provided to operate the rod 35 vertically. The lever is preferably in the form of a pivotally mounted bell crank. The lever 37 may be pivotally supported by a relatively stationary support or carrier 42. The carrier 42 is shown attached to the axle 20 intermediate its ends. The carrier 42 projects forwardly from axle 20 and the lever 37 is pivotally carried at its forward end. The forward end of the carrier 42 may be yoked and the lever 37 may have a fulcrum or central portion 37ª extending between the yoked parts of the carrier. A pivot pin 45 may pivotally connect the lever with the carrier 42. It is preferred that the portion 37ª of the lever fit freely between the yoke portions of the carrier 42 with a certain amount of clearance to permit the lever and rod 35 to tilt somewhat relative to the carrier 42. The lever 37 consists of two angularly related arms, an arm 46 projecting forwardly from the fulcrum 37ª or pivotal mounting of the lever, and an arm 47 normally projecting upwardly from the fulcrum of the lever. The forward end of the arm 46 is pivotally attached to the rod 35 and the actuating rod 38 is connected with the upper end of the arm 47.

The arm 46 of the lever 37 is pivotally connected to the rod 35 intermediate its ends. In the particular case illustrated the rod 35 is provided with a rearwardly projecting tongue 48 which extends between yoked portions 49 at the forward end of the arm 46. A pivot pin 50 extends through the yoke portions 49 and the tongue 48. The actuating rod 38 is pivotally attached to the upper end of the arm 47 of the lever. The actuating rod 38 extends horizontally forward from the arm 47 to the operator's compartment 11 of the truck. A suitable hand lever 51 may be provided in the compartment 11 for operating the rod 38. I have shown the rod 38 formed in two sections connected by a turn buckle 52. The turn buckle 52 is provided to vary or adjust the length of the actuating rod.

In accordance with the preferred form of the invention, means is provided for normally yieldingly holding the idlers 24 in the up positions free of the wheels 12 and 13 and for compensating for any variations there may be in the relative positions of the wheels 12 and 13 during operation of the idlers so that the idlers will properly engage the tires of the wheels when the wheels are not in their normal relative positions.

In the form of the invention illustrated in the drawings, helical springs 60 are arranged under tension between the pins 40 at the ends of the rod 35 and the frame members 17 of the truck. The rod 35 is permitted to tilt or rock somewhat due to the clearances left in the various pivotal connections above described. This freedom of the rod 35 to tilt allows the idlers operated at the ends of the rod to accommodate themselves to any variations that there may be in the relative positions of the wheels 12 and 13 at the opposite sides of the truck and permits the idlers to engage the vehicle wheels with equal pressures.

In Fig. 7 of the drawings I have illustrated a form of idler 24ª that is particularly adapted to be used in connection with tires 53 having a rounded tread. This form of idler is provided with a peripheral groove 54 adapted to receive the rounded treads of the tires. In Fig. 8 I have shown an idler 24ᵇ having a flat tread that may be used to advantage in connection with a vehicle provided with tires having flat treads, such as are usually provided on solid rubber tires. In Fig. 9 I have shown an idler 24ᶜ similar to the idler 24ᵇ and adapted to be used in connection with rubber tires 55 having flat treads. In this form of the invention a plurality of spaced projections 56 are provided on the periphery of the idler 24ᶜ.

The projections 56 may be comparatively small and formed so that they form an effective driving engagement between the idler 24ᶜ and the tires 55 without injuring the tires.

During normal operation of the vehicle or truck the idlers 24 may be positioned in their upper or idle positions so that the drive wheels 12 operate to drive the vehicle. In the event that the drive wheels 12 are not effective in properly operating the vehicle, the hand lever 51 may be operated to shift the actuating rod 38 forward. Upon forward movement of the rod 38 the lever 37 acts to shift the rod 35 downwardly. Downward movement of the rod 35 shifts the supports 27 downward so that the idlers 24 are brought into engagement with the tires 12ª and 13ª of the drive wheels 12 and the extension wheels 13, respectively. The idlers 24 may be maintained in pressure engagement with the tires 12ª and 13ª by means of the hand lever 51 and, being freely rotatable, form a drive connection between the wheels 12 and 13. It will be seen that driving the wheels 13 together with the wheels 12 provides greater traction surface with the ground or road surface than the single pair of wheels 12.

It is to be noted that the drive device provided by this invention is extremely simple of construction and may be applied to a truck, or the like, without altering the construction or normal operation of the truck. The rod 35 interconnects the supports 27 so that the idlers 24 may be simultaneously operated into and out of engagement with the tires 12ᵃ and 13ᵃ.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A vehicle drive of the character described including a drive wheel, an extension wheel, and an optional drive between the drive wheel and the extension wheel including an idler shiftable between a position free of both the wheels and a position in engagement with both of the wheels, and means for shifting the idler between said positions, including a support for the idler, a rod operable vertically to shift the support, and means for operating the rod.

2. A vehicle drive of the character described including a drive wheel, an extension wheel, and an optional drive between the drive wheel and the extension wheel including a rotatable idler shiftable between a position free of both the wheels and a position in engagement with both of the wheels, and means for shifting the idler, including a support for the idler, a rod operable to shift the support and means for operating the rod including a lever on the rod.

3. A vehicle drive of the character described including a drive wheel, an extension wheel, and a drive between the drive wheel and the extension wheel including an idler shiftable between a position free of both the wheels and a position in engagement with both of the wheels, and means for shifting the idler, including a support for the idler, a shiftable rod, a link connecting the rod and said support, a lever attached to the rod, and an actuating rod connected with the lever.

4. A vehicle drive of the character described including a drive wheel, an extension wheel, and a drive between the drive wheel and the extension wheel including an idler shiftable between a position free of both the wheels and a position in engagement with both of the wheels, and means for shifting the idler, including, a support shiftably supporting the idler, a shiftable rod connected with the support, a bell crank attached to the rod, an actuating rod attached to the bell crank, and a hand lever for operating the actuating rod.

5. In combination with a vehicle having a drive wheel at each side, an extension wheel at each side and an operator's compartment, an optional drive between the drive wheels and the extension wheels including an idler at each side of the vehicle shiftable between a position free of both the wheels and a position in engagement with both the wheels, and means for simultaneously shifting the idlers from the operator's compartment.

6. In combination with a vehicle having a drive wheel at each side, an extension wheel at each side and an operator's compartment, an optional drive between the drive wheels and the extension wheels including an idler at each side of the vehicle shiftable between a position free of both the wheels and a position in engagement with both the wheels, and means for simultaneously shifting the idlers from the operator's compartment, including supports carrying the idlers, a shiftable rod operatively connected with the said supports, and means for shifting the rod.

7. A vehicle drive of the character described including, a rotatable member adapted to be operated into and out of engagement with the tires of the driven wheel and extension wheel of a vehicle, and means for operating the member including, a shaft rotatably carrying the member, a vertical support carrying the shaft, a vertically shiftable rod connected with the support, a lever for operating the rod, and a horizontal actuating part attached to the lever.

8. A vehicle drive including, a drive wheel, an extension wheel, tires on the wheels, an idler operable to engage the tires of the wheels and having a plurality of notches in its periphery, and means for operating the idler into and out of engagement with the tires.

9. An attachment for a vehicle having a pair of drive wheels and a pair of extension wheels carried on axes transverse to the vehicle including, idlers for operatively connecting the drive and extension wheels, and manual control means for simultaneously moving the idlers into and out of operating position including a bell crank carried by the extension wheel axle.

10. In a road truck, a frame, a pair of rear driving wheels, an additional pair of rear wheels, spring suspension means to transfer the load from the frame to both pairs of wheels, resilient tires for said wheels, a friction roller operatively disposed between each of said driving and said additional wheels, means on the truck for guiding and supporting the roller, there being cooperating means adapted to be controlled by the operator of the truck for moving the roller into operative frictional contact with the tires of both said wheels, to convert the truck from double to four rear wheel drive.

11. The combination with a truck having a frame, rear driving wheels, and rear load supporting trailing wheels, of means for transmitting power from said driving to said trailing wheels, said means comprising a spring carried by said frame, an arm pivotally connected to and carried by said spring, and a roller rotatably carried by said arm and adapted to have frictional engagement with said driving and trailing wheels.

12. In combination with a truck having a frame, rear driving wheels, and rear trailing wheels, of means for transmitting power from said driving to said trailing wheels, said means comprising a resilient member carried by said frame, a roller carried by said resilient member and adapted to have frictional engagement with said driving and trailing wheels, means for positioning and maintaining said roller in operative alignment with said driving and trailing wheels, and means for moving said roller into and out of frictional engagement with said driving and trailing wheels while the truck is standing or in movement.

13. The combination with a truck having a frame, rear driving wheels, and rear, load supporting, trailing wheels, of means for transmitting power from said driving to said trailing wheels, said means comprising a spring carried by said frame, an arm pivotally connected to and carried by said spring, a roller rotatably carried by said arm and adapted to have frictional engagement with said driving and trailing wheels, and guiding means in spaced relation to the pivotal connection of the arm for holding the roller in operative alignment with said wheels.

In witness that I claim the foregoing I have hereunto subscribed my name this 25th day of November, 1929.

SAMUEL CLARK CARTER.